US012217558B2

(12) United States Patent
Kapoor et al.

(10) Patent No.: US 12,217,558 B2
(45) Date of Patent: Feb. 4, 2025

(54) FAULT REMEDIATION SYSTEM FOR A VEHICLE

(71) Applicant: GM Global Technology Operations LLC, Detroit, MI (US)

(72) Inventors: Saurabh Kapoor, Windsor (CA); Mustafa Hakan Turhan, Kitchener (CA); Nauman Sohani, Markham (CA); Hassan Askari, Thornhill (CA); Naser Mehrabi, Richmond Hill (CA); Ehsan Asadi, North York (CA); Sresht Gurumoorthi Annadevara, Toronto (CA); Seyedalireza Kasaiezadeh Mahabadi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 18/055,479

(22) Filed: Nov. 15, 2022

(65) Prior Publication Data

US 2024/0161556 A1 May 16, 2024

(51) Int. Cl.
*G07C 5/08* (2006.01)

(52) U.S. Cl.
CPC .................................. *G07C 5/0808* (2013.01)

(58) Field of Classification Search
CPC .................................................... G07C 5/0808
USPC ......................................................... 701/31.6
See application file for complete search history.

(56) References Cited

U.S. PATENT DOCUMENTS

| | | | | |
|---|---|---|---|---|
| 2013/0201817 | A1 * | 8/2013 | Jiang | H04L 41/0659 370/217 |
| 2019/0129789 | A1 * | 5/2019 | Koay | G06F 11/0793 |
| 2020/0156470 | A1 * | 5/2020 | Stanhope | A01B 79/02 |
| 2021/0070312 | A1 * | 3/2021 | Decius | B60W 50/04 |
| 2021/0303381 | A1 * | 9/2021 | Baldassarre | G06N 5/04 |
| 2022/0363242 | A1 * | 11/2022 | Deckmyn | B60W 20/30 |
| 2024/0161556 | A1 * | 5/2024 | Kapoor | G07C 5/0808 |

* cited by examiner

*Primary Examiner* — Tyler D Paige
(74) *Attorney, Agent, or Firm* — Vivacqua Crane, PLLC

(57) ABSTRACT

A fault remediation system for a vehicle includes one or more controllers in electronic communication with one or more consumed interfaces and one or more provided interfaces. The one or more controllers execute instructions to receive, from the one or more consumed interfaces, a consumed signal and perform fault detection upon the consumed signal to determine the presence of an active fault within the consumed signal. In response to detecting an active fault with the consumed signal, the one or more controllers select a remediation state from a group of two or more prospective remediation states based on a significance analysis of the consumed signal. The one or more controllers evaluate a relevant subfunction that corresponds to the consumed signal that the remediation state addresses for the presence of remediation tolerance and generates arbitration instructions based on the remediation tolerance.

20 Claims, 3 Drawing Sheets

FAULT REMEDIATION SYSTEM FOR A VEHICLE

INTRODUCTION

The present disclosure relates to a fault remediation system for a vehicle, and more particularly to a fault remediation system for selecting a remediation state from a group of two or more prospective remediation states. The selected remediation state addresses an active fault of a consumed signal.

Many vehicles include a modular control system architecture, which discretizes functions into subfunctions to achieve overarching control objectives. While a modular control system architecture may facilitate development and testing, there are challenges the modular control system architecture faces when attempting to address corrupted data. Specifically, for example, one or more sensors that collect data consumed and analyzed by a vehicle motion control system may experience a fault. Corrupted sensor data may be propagated throughout the vehicle motion controller to downstream functions, which in turn may create issues such as preemptively aborting a control function, limiting vehicle control capability, or relying on worst-case remedial actions. For example, an electronic all-wheel-drive (eAWD) controller relies upon data collected by a steering angle sensor. There is a possibility that the eAWD controller may be deactivated in response to the steering angle sensor experiencing a fault, which may adversely affect a customer's experience. In addition to the eAWD controller, other vehicle motion controllers such as an electronic limited slip differential (eLSD) controller may be deactivated to remediate corrupted data as well.

Thus, while systems based on a modular control system architecture achieve their intended purpose, there is a need in the art for an improved approach to address and remediate corrupted data.

SUMMARY

According to several aspects, a fault remediation system for a vehicle is disclosed, and includes one or more controllers in electronic communication with one or more consumed interfaces and one or more provided interfaces. The one or more controllers execute instructions to receive, from the one or more consumed interfaces, a consumed signal. The one or more controllers perform fault detection upon the consumed signal to determine the presence of an active fault within the consumed signal. In response to detecting an active fault with the consumed signal, the one or more controllers select a remediation state from a group of two or more prospective remediation states based on a significance analysis of the consumed signal, where the remediation state addresses the active fault of the consumed signal. The one or more controllers evaluate a relevant subfunction that corresponds to the consumed signal that the remediation state addresses for the presence of remediation tolerance. The one or more controllers generate arbitration instructions based on the remediation tolerance and execute the relevant subfunction that corresponds to the consumed signal that the remediation state addresses based on the arbitration instructions.

In another aspect, the group of prospective remediation states include two or more of the following: a related interface state, a secondary interface state, a fault-tolerant logic state, a last known good value state, and a constant value state.

In yet another aspect, the related interface state includes transitioning the consumed signal to a remediated signal, and where the remediated signal is derived from a source that measures the same parameter as the one or more consumed interfaces that generate the consumed signal.

In an aspect, the secondary interface state includes transitioning from the consumed signal to a remediated signal, wherein the remediated signal is derived from one or more sources that measure another parameter than the consumed signal.

In another aspect, the fault-tolerant logic state includes transitioning from the consumed signal to a remediated signal, where the remediated signal is derived by combining two or more signals together.

In yet another aspect, the two or more signals are each generated by a source that is not the consumed interface that generates the consumed signal.

In an aspect, the last known good value state includes latching a last known value of the consumed signal prior to detecting the active fault, wherein the last known value is the remediated signal.

In another aspect, the constant value state includes converging from the consumed signal to a constant value in response to detecting the active fault, where the constant value is the remediated signal.

In yet another aspect, the significance analysis selects the remediation state based on one or more of the following: an importance of the consumed signal upon a relevant subfunction, a driving state of the vehicle, and the presence of one or more alternative signals utilized to calculate a remediated signal.

In an aspect, the one or more controllers execute instructions to determine the remediation tolerance is absent in the relevant subfunction, and in response to determining the remediation tolerance is absent in the relevant subfunction, generate arbitration instructions that instruct the one or more controllers to deactivate the relevant subfunction.

In yet another aspect, the one or more controllers execute instructions to determine the remediation tolerance is present in the relevant subfunction, and in response to determining the remediation tolerance is present in the relevant subfunction, generate arbitration instructions instructing the one or more controllers to consume the remediated signal in place of the consumed signal.

In an aspect, the one or more controllers execute instructions to determine a level of operation for the relevant subfunction based on the arbitration instructions and execute the relevant subfunction based on the level of operation.

In another aspect, the level of operation for the relevant subfunction is selected from the following: a fully functional level, a remediated level, and a deactivated level.

In yet another aspect, the one or more controllers execute instructions to filter the consumed signal by adjusting values of one or more filter coefficients based on a health of the consumed signal.

In an aspect, a method for addressing an active fault by a fault remediation system includes receiving, from one or more consumed interfaces, a consumed signal. The method includes performing, by one or more controllers, fault detection upon the consumed signal to determine the presence of an active fault within the consumed signal. In response to detecting an active fault with the consumed signal, the method includes selecting a remediation state from a group of two or more prospective remediation states based on a significance analysis of the consumed signal, where the remediation state addresses the active fault of the consumed signal. The method includes evaluating a relevant subfunction that corresponds to the consumed signal that the remediation state addresses for the presence of remediation tolerance. The method includes generating arbitration instructions based on the remediation tolerance. Finally, the method includes executing the relevant subfunction that corresponds to the consumed signal that the remediation state addresses based on the arbitration instructions.

In another aspect, a vehicle is disclosed and includes a fault remediation system including one or more consumed interfaces, one or more provided interfaces, and one or more controllers in electronic communication with the one or more consumed interfaces and the one or more provided interfaces. The one or more controllers execute instructions to receive, from the one or more consumed interfaces, a consumed signal. The one or more controllers perform fault detection upon the consumed signal to determine the presence of an active fault within the consumed signal. In response to detecting an active fault with the consumed signal, the one or more controllers select a remediation state from a group of two or more prospective remediation states based on a significance analysis of the consumed signal, where the remediation state addresses the active fault of the consumed signal. The one or more controllers evaluate a relevant subfunction that corresponds to the consumed signal that the remediation state addresses for the presence of remediation tolerance. The one or more controllers generate arbitration instructions based on the remediation tolerance and determine a level of operation for the relevant subfunction based on the arbitration instructions, where the level of operation for the relevant subfunction is selected from the following: a fully functional level, a remediated level, and a deactivated level. The one or more controllers execute the relevant subfunction that corresponds to the consumed signal that the remediation state addresses based on the arbitration instructions and the level of operation.

In an aspect, the group of prospective remediation states include two or more of the following: a related interface state, a secondary interface state, a fault-tolerant logic state, a last known good value state, and a constant value state.

In another aspect, the significance analysis selects the remediation state based on one or more of the following: an importance of the consumed signal upon a relevant subfunction, a driving state of the vehicle, and the presence of one or more alternative signals utilized to calculate a remediation signal.

In yet another aspect, the one or more controllers execute instructions to determine the remediation tolerance is absent in the relevant subfunction, and in response to determining the remediation tolerance is absent in the relevant subfunction, generate arbitration instructions that instruct the one or more controllers to deactivate the relevant subfunction.

In an aspect, the one or more controllers execute instructions to determine the remediation tolerance is present in the relevant subfunction and in response to determining the remediation tolerance is present in the relevant subfunction, generate arbitration instructions instructing the one or more controllers to consume the remediated signal in place of the consumed signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
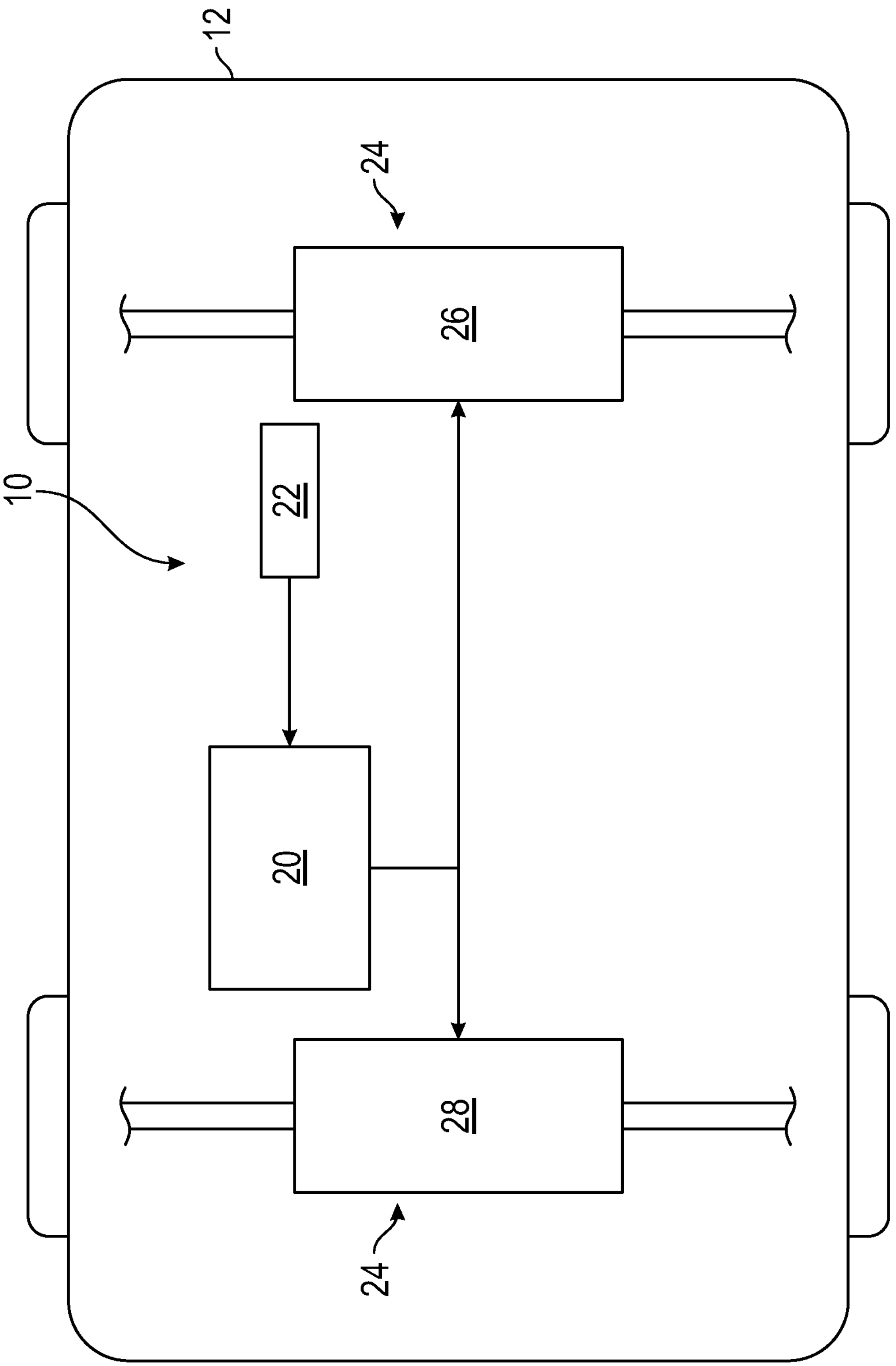
FIG. 1 is a schematic diagram of the disclosed fault remediation system for a vehicle, where the fault remediation system includes one or more controllers, according to an exemplary embodiment.

Referring to FIG. 1, an exemplary fault remediation system 10 for a vehicle 12 is illustrated. It is to be appreciated that the vehicle 12 may be any type of vehicle such as, but not limited to, a sedan, truck, sport utility vehicle, van, or motor home. The fault remediation system 10 includes one or more controllers 20 in electronic communication with one or more consumed interfaces 22 and one or more provided interfaces 24. The one or more consumed interfaces 22 include any source of data that is consumed and analyzed by the one or more controllers 20 such as, for example, sensors and other controllers that are part of the vehicle 12. The one or more provided interfaces 24 include systems and subsystems that are part of the vehicle 12 that consume data analyzed by the one or more controllers 20. As explained below, the fault remediation system 10 addresses an active fault with one or more signals that are consumed by the one or more controllers 20.

In one non-limiting embodiment, the one or more controllers 20 are part of a vehicle motion control system. In this embodiment, the one or more consumed interfaces 22 include, but are not limited to, an inertial measurement unit (IMU), a steering angle sensor, wheel speed sensors, wheel-to-body sensors, and a global positioning system (GPS). In the present example, the one or more provided interfaces 24 include, but are not limited to, an electronic all-wheel-drive (eAWD) system 26 and an electronic limited slip differential (eLSD) system 28. It is to be appreciated that while the fault remediation system 10 is illustrated as part of a motion control system for the vehicle 12, FIG. 1 is merely exemplary in nature and the fault remediation system 10 is not limited to vehicles. Indeed, the fault remediation system 10 may be implemented in any application that employs modular control system architecture such as, for example, aerospace and manufacturing applications.

Figure 2:
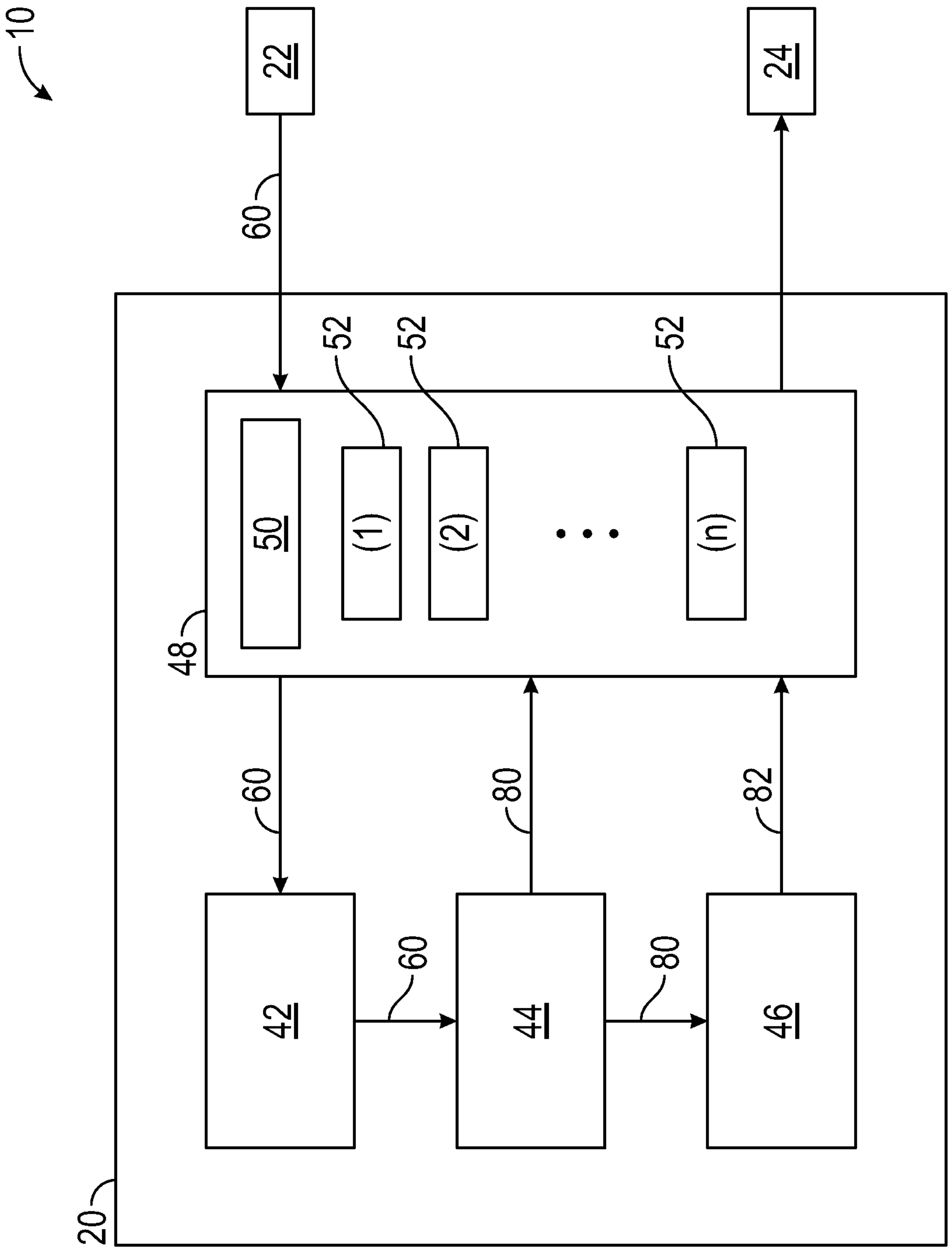
FIG. 2 is a block diagram of the one or more controllers shown in FIG. 1, according to an exemplary embodiment.

FIG. 2 is a diagram of the one or more controllers 20 shown in FIG. 1, where the one or more controllers 20 include a signal processing module 42, a remediation module 44, an arbitration module 46, and a function module 48. The function module 48 executes two or more subfunctions 52 that are part of a deconstructed function 50. In one non-limiting embodiment, a nested subfunction structure may also be used as well. As explained below, the fault remediation system 10 includes a fault tolerant architecture that analyzes consumed signals 60 from the consumed interfaces 22 (FIG. 1) that are received by the one or more controllers 20 for active faults. In response to detecting an active fault with the consumed signal 60, the fault remediation system 10 selects a remediation state from a group of two or more prospective remediation states based on a significance analysis of the consumed signal 60, where the selected remediation state addresses an active fault of the consumed signal 60. Specifically, the selected remediation state may preserve at least a portion of the functionality of the motion control system, even after the one or more controllers 20 has consumed an active fault. The selected remediation system may also ensure that the active faults are not propagated to one or more downstream subfunctions 52.

Referring to FIG. 2, the signal processing module 42 of the one or more controllers 20 receives the consumed signals 60 from the one or more consumed interfaces 22 (seen in FIG. 1). The signal processing module 42 filters and calibrates the consumed signal 60 and performs fault detection to determine if an active fault is present within the consumed signal 60. Filtering the consumed signal 60 includes adjusting values of one or more filter coefficients based on a health of the consumed signal 60. Specifically, the signal processing module 42 adjusts the value of a filter coefficient to increase a weight of the consumed signal 60 in response to determining the consumed signal 60 has robust health. Similarly, the signal processing module 42 decreases the weight of the consumed signal 60 in response to determining the health of the consumed signal 60 is compromised. The signal processing module 42 also calibrates the consumed signal 60 based on a target vehicle response. The target vehicle response is determined based on factors such as, but not limited to, driver mode selection, and traction mode state. For example, the consumed signal 60 may be calibrated to generate a target vehicle response that increases horsepower or speed when the driver mode selection is set to a performance mode.

After performing signal processing, the signal processing module 42 performs fault detection upon the consumed signal 60 to determine the presence of an active fault within the consumed signal 60. In response to detecting an active fault with the consumed signal 60, the signal processing module 42 sends the consumed signal 60 to the remediation module 44. The remediation module 44 of the one or more controllers 20 selects a remediation state from a group of two or more prospective remediation states based on a significance analysis of the consumed signal 60. The significance analysis of the consumed signal 60 is described below. The remediation state addresses the active fault of the consumed signal 60. In one non-limiting embodiment, the group of prospective remediation states include a related interface state, a secondary interface state, a fault-tolerant logic state, a last known good value state, and a constant value state. However, it is to be appreciated that the group of prospective remediation states may include fewer prospective remediation states or additional prospective remediation states as well.

The related interface state includes transitioning the consumed signal 60 to a remediated signal 80, where the remediated signal 80 is derived from a source that measures the same parameter as the consumed interface 22 (FIG. 1) that generates the consumed signal 60. For example, if the consumed signal 60 is generated by one of the wheel speed sensors that are part of the vehicle 12 (FIG. 1), then the source would be another wheel speed sensor located on the same axle but at a different corner of the vehicle 12. In the present example, the same parameter measured by the consumed signal 60 and the remediated signal 80 is rotational speed. It is to be appreciated that the remediation module 44 may employ various filtration techniques to manage the transition between the consumed signal 60 to the remediated signal 80.

The secondary interface state includes transitioning from the consumed signal 60 to a remediated signal 80, where the remediated signal 80 is derived from one or more sources that measure another parameter than the consumed signal 60. In the present example, if the consumed signal 60 is generated by one of the wheel speed sensors that are part of the vehicle 12, then the remediated signal 80 would be generated based on an estimated wheel or axle torque value from the same axle as the wheel speed sensor.

The fault-tolerant logic state includes transitioning from the consumed signal 60 to a remediated signal 80, where the remediated signal 80 is derived by combining two or more signals together. The two or more signals are each generated by a source that is not the consumed interface 22 (FIG. 1) that generates the consumed signal 60. For example, if the consumed signal 60 measures yaw rate, then the remediated signal 80 is created by combining two or more signals that each measure a different parameter when compared to the consumed signal 60. For example, if the consumed signal 60 is a yaw rate signal and the consumed interface 22 is a yaw rate sensor, then the remediated signal 80 is derived by combining a lateral acceleration, a tire position measured by one or more wheel-to-body sensors, position data collected by the GPS, a steering angle, and vehicle speed.

The last known good value state includes latching a last known value of the consumed signal 60 prior to detecting the active fault, where the last known value is the remediated signal 80. For example, if the consumed signal 60 is yaw rate, then the last known value prior to detecting the active fault for the yaw rate may be used as the remediated signal 80. Finally, the constant value state includes converging from the consumed signal 60 to a constant value in response to detecting the active fault, where the constant value is the remediated signal 80. The calibrated constant value is a predetermined value that does not interfere with the remaining subfunctions 52 that are executed by the function module 48.

The remediation module 44 selects the remediation state from the group of two or more prospective remediation states based on the significance analysis. The significance analysis selects the remediation state based on one or more of the following: an importance of the consumed signal 60 upon a relevant subfunction 52, a driving state of the vehicle 12 (FIG. 1), and the presence of one or more alternative signals utilized to calculate the remediation signal 80. The relevant subfunction 52 is executed by the function module 48 and relies upon the consumed signal 60.

The importance of the consumed signal 60 upon a relevant subfunction 52 is determined based on the specific function that the consumed signal 60 instructs the vehicle 12 to execute, where some specific functions are of greater importance than other functions. For example, if the consumed signal 60 indicates a total loss of wheel slip control function, then the specific function is wheel slip control, and the remediation module 44 selects a remediation state that addresses the wheel slip. In contrast, if the consumed signal 60 indicates a partial loss of lateral control, then the remediation module 44 would select a remediation state that address the partial loss of lateral control. The driving state of the vehicle 12 indicates a behavior of the vehicle 12 during operation. In an embodiment, the driving states of the vehicle 12 are selected from steady-state conditions and dynamic conditions. The dynamic conditions may vary in degree, where a highly dynamic condition indicates the vehicle 12 travels at high speed and/or the vehicle 12 executes maneuvers in a relatively short period of time. When the driving state indicates steady-state conditions, the remediation module 44 selects a remediation state that retains the current control state of the vehicle 12 such as the last known good value state or the constant value state.

When the driving state indicates a highly dynamic condition, then the remediation module 44 selects a remediation state that retains the current control state of the vehicle such as the last known good value state for a predetermined amount of time. For example, the lateral acceleration during a highly dynamic condition would be held for a predetermined period of time. The one or more alternative signals are used in place of the consumed signal 60, however, it is to be appreciated that alternative signals may not always be available. For example, if one or more alternative signals are available, then the remediation module 44 may select the related interface state, the secondary interface state, or the fault-tolerant logic state as the remediation state. However, if no alternative signals are available, then the remediation module 44 may select either the last known good value state or the constant value state as the remediation state.

The remediation module 44 then sends the remediated signal 80 as well as the active fault that corresponds to the consumed signal 60 that the remediated signal 80 addresses to the arbitration module 46. The arbitration module 46 of the one or more controllers 20 evaluates the relevant subfunction 52 that corresponds to the consumed signal 60 that the remediation state addresses for remediation tolerance and generates arbitration instructions 82 based on the remediation tolerance. When the relevant subfunction 52 is unable to tolerate any remediation, the arbitration module 46 determines remediation tolerance is absent in the relevant subfunction 52, and the arbitration module 46 generates arbitration instructions 82 that instruct the function module 48 of the one or more controllers 20 to deactivate the relevant subfunction 52. In contrast, when the relevant subfunction 52 tolerates remediation, the arbitration module 46 determines remediation tolerance is present in the relevant subfunction 52. Specifically, remediation tolerance indicates the remediated signal 80 affects but does not compromise operation of the relevant subfunction 52. In response to determining the remediated signal 80 tolerate remediation, the arbitration module 46 generates arbitration instructions 82 instructing the function module 48 of the one or more controllers 20 to consume the remediated signal 80 in place of the consumed signal 60.

The function module 48 of the one or more controllers 20 receives the remediated signal 80 and the arbitration instructions 82 as input and executes the relevant subfunction 52 based on the remediated signal 80 and the arbitration instructions 82. Specifically, the function module 48 determines a level of operation for the relevant subfunction 52 based on the arbitration instructions 82 and executes the relevant subfunction 52 based on the level of operation. In an embodiment, the level of operation for the relevant subfunction 52 is selected from the following: a fully functional level, a remediated level, and a deactivated level. When the arbitration instructions 82 indicate the fully functional level as the level of operation, the function module 48 determines that no active faults exist for signals consumed by the relevant subfunction 52, and the relevant subfunction 52 is executed based on the consumed signal 60. When the arbitration instructions 82 indicate the remediated level, the function module 48 executes the relevant subfunction 52 based on the remediated signal 80. When executed at the remediated level, the relevant subfunction 52 maintains core functionality, however, it is to be appreciated that the relevant subfunction 52 may abstain from generating a final output depending on the circumstances. When the arbitration instructions 82 indicate the deactivated level, the function module 48 does not execute the relevant subfunction 52 based on the consumed signal 60 or the remediated signal 80. Instead, the function module 48 outputs a value that will not interfere with the execution of the remaining downstream subfunctions 52.

In one non-limiting example, the one or more controllers 20 are part of the (eAWD) system 26 shown in FIG. 1. In the present example, the one or more subfunctions 52 include four subfunctions 52 that are directed to feedforward control, lateral control, wheel control, and core arbitration. In the event the steering sensor experiences a fault, instead of deactivating the entire eAWD controller, specific nested subfunctions 52 are deactivated instead. For example, the subfunction 52 directed towards feedforward control includes two nested subfunctions, open loop command generation and feedforward tractive limit calculation. In this example, the open loop command generation nested subfunction is executed at the fully functional level, and the feedforward tractive limit calculation nested subfunction is executed at the deactivated level. The subfunction 52 directed towards lateral control includes two nested subfunctions, total torque reduction and front/rear torque split determination. In this example, the total torque reduction nested subfunction is executed at the fully functional level, and the front/rear torque split determination nested subfunction is executed at the deactivated level.

Figure 3:
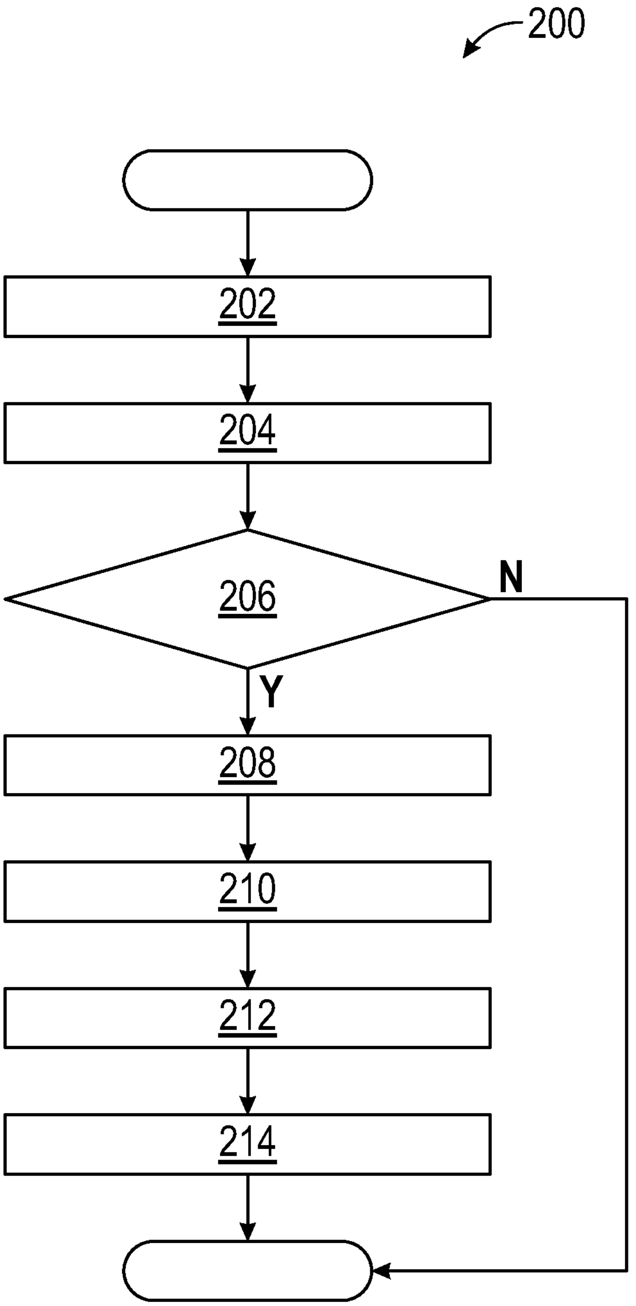
FIG. 3 is a process flow diagram illustrating a method for addressing an active fault by the fault remediation system, according to an exemplary embodiment.

FIG. 3 is an exemplary process flow diagram illustrating a method 200 for addressing an active fault by the fault remediation system 10. Referring generally to FIGS. 1-3, the method 200 may begin at block 202. In block 202, the signal processing module 42 of the one or more controllers 20 receives the consumed signal 60 from the one or more consumed interfaces 22 (seen in FIG. 1). The method 200 may then proceed to block 204.

In block 204, the signal processing module 42 of the one or more controllers 20 filters and calibrates the consumed signal 60. The method 200 may then proceed to decision block 206.

In decision block 206, the signal processing module 42 of the one or more controllers 20 performs fault detection upon the consumed signal 60 to determine the presence of an active fault within the consumed signal 60. Specifically, if no active fault is detected, then the method 200 may terminate. However, in response to detecting an active fault with the consumed signal 60, the method 200 may then proceed to block 208.

In block 208, the remediation module 44 of the one or more controllers 20 select the remediation state from the group of two or more prospective remediation states based on the significance analysis of the consumed signal 60, where the remediation state addresses the active fault of the consumed signal 60. The method 200 may then proceed to block 210.

In block 210, the arbitration module 46 of the one or more controllers 20 evaluates the relevant subfunction 52 that corresponds to the consumed signal 60 that the remediation state addresses for remediation tolerance and generates arbitration instructions 82 based on the remediation tolerance. The method 200 may then proceed to block 212.

In block 212, the arbitration module 46 of the one or more controllers 20 generates arbitration instructions 82 based on the remediation tolerance. The method 200 may then proceed to block 214.

In block 214, function module 48 of the one or more controllers 20 executes the relevant subfunction 52 that corresponds to the consumed signal 60 that the remediation state addresses based on the arbitration instructions 82. The method 200 may then terminate.

Referring generally to the figures, the disclosed fault remediation system provides various technical effects and benefits. Specifically, the fault remediation system addresses active faults that are consumed by one or more controllers based on a significance analysis. The fault remediation system also intelligently arbitrates specific subfunctions that are executed by the system to preserve at least some functionality and to minimize the impact on downstream subfunctions. In contrast, some conventional systems may allow for corrupted sensor data to propagate throughout a controller to downstream functions, which results in the controller preemptively aborting a control function.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A fault remediation system for a vehicle, the fault remediation system comprising:

one or more controllers in electronic communication with one or more consumed interfaces and one or more provided interfaces, wherein the one or more provided interfaces include an electronic all-wheel-drive (eAWD) system, the one or more controllers executing instructions to:

receive, from the one or more consumed interfaces, a consumed signal, wherein the consumed signal is generated by a sensor that is part of the vehicle;

perform fault detection upon the consumed signal to determine the presence of an active fault within the consumed signal;

in response to detecting an active fault with the consumed signal, select a remediation state from a group of two or more prospective remediation states based on a significance analysis of the consumed signal, wherein the remediation state addresses the active fault of the consumed signal, wherein the group of two or more prospective remediation states include two or more of the following: a related interface state, a secondary interface state, a fault-tolerant logic state, a last known good value state, and a constant value state;

evaluate a relevant subfunction that corresponds to the consumed signal that the remediation state addresses for the presence of remediation tolerance, wherein the relevant subfunction includes one or more of the following: feedforward control, lateral control, wheel control, and core arbitration;

generate arbitration instructions based on the remediation tolerance; and execute the relevant subfunction that corresponds to the consumed signal that the remediation state addresses based on the arbitration instructions instead of deactivating the one or more controllers, wherein executing the relevant subfunction includes deactivating specific nested subfunctions that are part of the relevant subfunction.

2. The fault remediation system of claim 1, wherein the related interface state includes transitioning the consumed signal to a remediated signal, and wherein the remediated signal is derived from a source that measures the same parameter as the one or more consumed interfaces that generate the consumed signal.

3. The fault remediation system of claim 1, wherein the secondary interface state includes transitioning from the consumed signal to a remediated signal, wherein the remediated signal is derived from one or more sources that measure another parameter than the consumed signal.

4. The fault remediation system of claim 1, wherein the fault-tolerant logic state includes transitioning from the consumed signal to a remediated signal, wherein the remediated signal is derived by combining two or more signals together.

5. The fault remediation system of claim 4, wherein the two or more signals are each generated by a source that is not one of the one or more consumed interfaces that generates the consumed signal.

6. The fault remediation system of claim 1, wherein the last known good value state includes latching a last known value of the consumed signal prior to detecting the active fault, wherein the last known value is the remediated signal.

7. The fault remediation system of claim 1, wherein the constant value state includes converging from the consumed signal to a constant value in response to detecting the active fault, where the constant value is the remediated signal.

8. The fault remediation system of claim 1, wherein the significance analysis selects the remediation state based on one or more of the following: an importance of the consumed signal upon a relevant subfunction, a driving state of the vehicle, and the presence of one or more alternative signals utilized to calculate a remediated signal.

9. The fault remediation system of claim 1, wherein the one or more controllers execute instructions to:

determine the remediation tolerance is absent in the relevant subfunction; and in response to determining the remediation tolerance is absent in the relevant subfunction, generate arbitration instructions that instruct the one or more controllers to deactivate the relevant subfunction.

10. The fault remediation system of claim 1, wherein the one or more controllers execute instructions to:

determine the remediation tolerance is present in the relevant subfunction; and in response to determining the remediation tolerance is present in the relevant subfunction, generate arbitration instructions instructing the one or more controllers to consume the remediated signal in place of the consumed signal.

11. The fault remediation system of claim 1, wherein the one or more controllers execute instructions to:

determine a level of operation for the relevant subfunction based on the arbitration instructions; and execute the relevant subfunction based on the level of operation.

12. The fault remediation system of claim 11, wherein the level of operation for the relevant subfunction is selected from the following: a fully functional level, a remediated level, and a deactivated level.

13. The fault remediation system of claim 1, wherein the one or more controllers execute instructions to:

filter the consumed signal by adjusting values of one or more filter coefficients based on a health of the consumed signal.

14. The fault remediation system of claim 1, wherein the one or more consumed interfaces include one or more of the following: an inertial measurement unit (IMU), a steering angle sensor, wheel speed sensors, wheel-to-body sensors, and a global positioning system (GPS).

15. A method for addressing an active fault by a fault remediation system for a vehicle, the method comprising:

receiving, from one or more consumed interfaces, a consumed signal, wherein the consumed signal is generated by a sensor that is part of the vehicle;

performing, by one or more controllers, fault detection upon the consumed signal to determine the presence of an active fault within the consumed signal, wherein the one or more controllers are in electronic communication with one or more provided interfaces that include an electronic all-wheel-drive (eAWD) system;

in response to detecting an active fault with the consumed signal, selecting a remediation state from a group of two or more prospective remediation states based on a significance analysis of the consumed signal, wherein the remediation state addresses the active fault of the consumed signal and the group of two or more prospective remediation states include two or more of the following: a related interface state, a secondary interface state, a fault-tolerant logic state, a last known good value state, and a constant value state;

evaluating a relevant subfunction that corresponds to the consumed signal that the remediation state addresses for the presence of remediation tolerance, wherein the relevant subfunction includes one or more of the following: feedforward control, lateral control, wheel control, and core arbitration;

generating arbitration instructions based on the remediation tolerance; and executing the relevant subfunction that corresponds to the consumed signal that the remediation state addresses based on the arbitration instructions instead of deactivating the one or more controllers, wherein executing the relevant subfunction includes deactivating specific nested subfunctions that are part of the relevant subfunction.

16. A vehicle, comprising:

a fault remediation system including:

one or more consumed interfaces;

one or more provided interfaces, wherein the one or more provided interfaces include an electronic all-wheel-drive (eAWD) system;

one or more controllers in electronic communication with the one or more consumed interfaces and the one or more provided interfaces, the one or more controllers executing instructions to:

receive, from the one or more consumed interfaces, a consumed signal, wherein the consumed signal is generated by a sensor that is part of the vehicle;

perform fault detection upon the consumed signal to determine the presence of an active fault within the consumed signal;

in response to detecting an active fault with the consumed signal, select a remediation state from a group of two or more prospective remediation states based on a significance analysis of the consumed signal, wherein the remediation state addresses the active fault of the consumed signal, wherein the group of two or more prospective remediation states include two or more of the following: a related interface state, a secondary interface state, a fault-tolerant logic state, a last known good value state, and a constant value state;

evaluate a relevant subfunction that corresponds to the consumed signal that the remediation state addresses for the presence of remediation tolerance, wherein the relevant subfunction includes one or more of the following: feedforward control, lateral control, wheel control, and core arbitration;

generate arbitration instructions based on the remediation tolerance;

determine a level of operation for the relevant subfunction based on the arbitration instructions, wherein the level of operation for the relevant subfunction is selected from the following: a fully functional level, a remediated level, and a deactivated level; and execute the relevant subfunction that corresponds to the consumed signal that the remediation state addresses based on the arbitration instructions and the level of operation instead of deactivating the one or more controllers, wherein executing the relevant subfunction includes deactivating specific nested subfunctions that are part of the relevant subfunction.

17. The vehicle of claim 16, wherein the significance analysis selects the remediation state based on one or more of the following: an importance of the consumed signal upon a relevant subfunction, a driving state of the vehicle, and the presence of one or more alternative signals utilized to calculate a remediation signal.

18. The vehicle of claim 16, wherein the one or more controllers execute instructions to:

determine the remediation tolerance is absent in the relevant subfunction; and in response to determining the remediation tolerance is absent in the relevant subfunction, generate arbitration instructions that instruct the one or more controllers to deactivate the relevant subfunction.

19. The vehicle of claim 16, wherein the one or more controllers execute instructions to:

determine the remediation tolerance is present in the relevant subfunction; and in response to determining the remediation tolerance is present in the relevant subfunction, generate arbitration instructions instructing the one or more controllers to consume the remediated signal in place of the consumed signal.

20. The vehicle of claim 16, wherein the one or more consumed interfaces include one or more of the following: an inertial measurement unit (IMU), a steering angle sensor, wheel speed sensors, wheel-to-body sensors, and a global positioning system (GPS).

* * * * *